United States Patent
Minematsu et al.

(10) Patent No.: US 11,870,313 B2
(45) Date of Patent: Jan. 9, 2024

(54) ROTARY ELECTRIC MACHINE

(71) Applicant: MINEBEA MITSUMI Inc., Nagano (JP)

(72) Inventors: Yasuhiro Minematsu, Kitasaku-gun (JP); Tomoaki Nakano, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 186 days.

(21) Appl. No.: 17/340,520

(22) Filed: Jun. 7, 2021

(65) Prior Publication Data

US 2022/0014063 A1 Jan. 13, 2022

(30) Foreign Application Priority Data

Jul. 13, 2020 (JP) ................. 2020-120077

(51) Int. Cl.
*H02K 3/38* (2006.01)
*H02K 3/28* (2006.01)
*H02K 3/52* (2006.01)
*H02K 3/32* (2006.01)
*H02K 3/34* (2006.01)

(52) U.S. Cl.
CPC ............... *H02K 3/28* (2013.01); *H02K 3/325* (2013.01); *H02K 3/345* (2013.01); *H02K 3/38* (2013.01); *H02K 3/522* (2013.01); *H02K 2203/06* (2013.01)

(58) Field of Classification Search
CPC ....... H02K 2203/06; H02K 3/38; H02K 3/345
See application file for complete search history.

(56) References Cited

U.S. PATENT DOCUMENTS

2008/0157610 A1    7/2008   Watanabe et al.

FOREIGN PATENT DOCUMENTS

| JP | 2008-167604 A | 7/2008 |
| JP | 2015-171239 A | 9/2015 |
| WO | WO-2020174817 A1 * | 9/2020 |

* cited by examiner

*Primary Examiner* — Ramon M Barrera
(74) *Attorney, Agent, or Firm* — Pearne & Gordon LLP

(57) ABSTRACT

A rotary electric machine includes a first coil including a winding start and a winding end, a first crossover wire connecting to the winding start of the first coil, a second crossover wire connecting to the winding end of the first coil, and an insulator including a tubular part wound around with the first coil and an outer circumferential lateral surface coupled with the tubular part. The outer circumferential lateral surface of the insulator is formed with a plurality of recess parts in a rotation axis direction, and the first crossover wire and the second crossover wire are disposed in two recess parts located at different positions in the rotation axis direction, among the plurality of recess parts.

7 Claims, 17 Drawing Sheets

ROTARY ELECTRIC MACHINE

CROSS REFERENCE TO RELATED APPLICATIONS

This application claims the benefit of Japanese Application No. 2020-120077, filed Jul. 13, 2020, the entire disclosure of which is hereby incorporated herein by reference.

TECHNICAL FIELD

The present invention relates to a rotary electric machine.

BACKGROUND ART

When a coil is wound in a rotary electric machine such as a three-phase motor or a three-phase generator, a crossover wire may be routed to a slot on an opposite side by 180 degrees. In this case, in a known technique, three grooves for winding a crossover wire are formed in an insulator to wind the crossover wire in a three-stage structure, so that the crossover wire does not overlap with a crossover wire in another phase.

CITATION LIST

Patent Literature

Patent Literature 1: JP 2015-171239 A
Patent Literature 2: JP 2008-167604 A

SUMMARY OF INVENTION

Technical Problem

When a coil is wound in a rotary electric machine, a crossover wire may enter a slot from a groove formed in an insulator, and after the coil has been wound around teeth in the slot, the crossover wire may be routed to a groove at another stage. At this time, it may be difficult to route the lead wire to the groove at the other stage.

In one aspect, an object is to provide a rotary electric machine configured to allow a lead wire to be easily wound.

Solution to Problem

In one aspect, a rotary electric machine includes a first coil including a winding start and a winding end, a first crossover wire connecting to the winding start of the first coil, a second crossover wire connecting to the winding end of the first coil, and an insulator including a tubular part wound around with the first coil and an outer circumferential lateral surface coupled with the tubular part. The outer circumferential lateral surface of the insulator is formed with a plurality of recess parts in a rotation axis direction, and the first crossover wire and the second crossover wire are disposed in two recess parts located at different positions in the rotation axis direction, among the plurality of recess parts.

According to one aspect, it is possible to provide a rotary electric machine configured to allow a lead wire to be easily wound.

DESCRIPTION OF EMBODIMENTS

Figure 1:
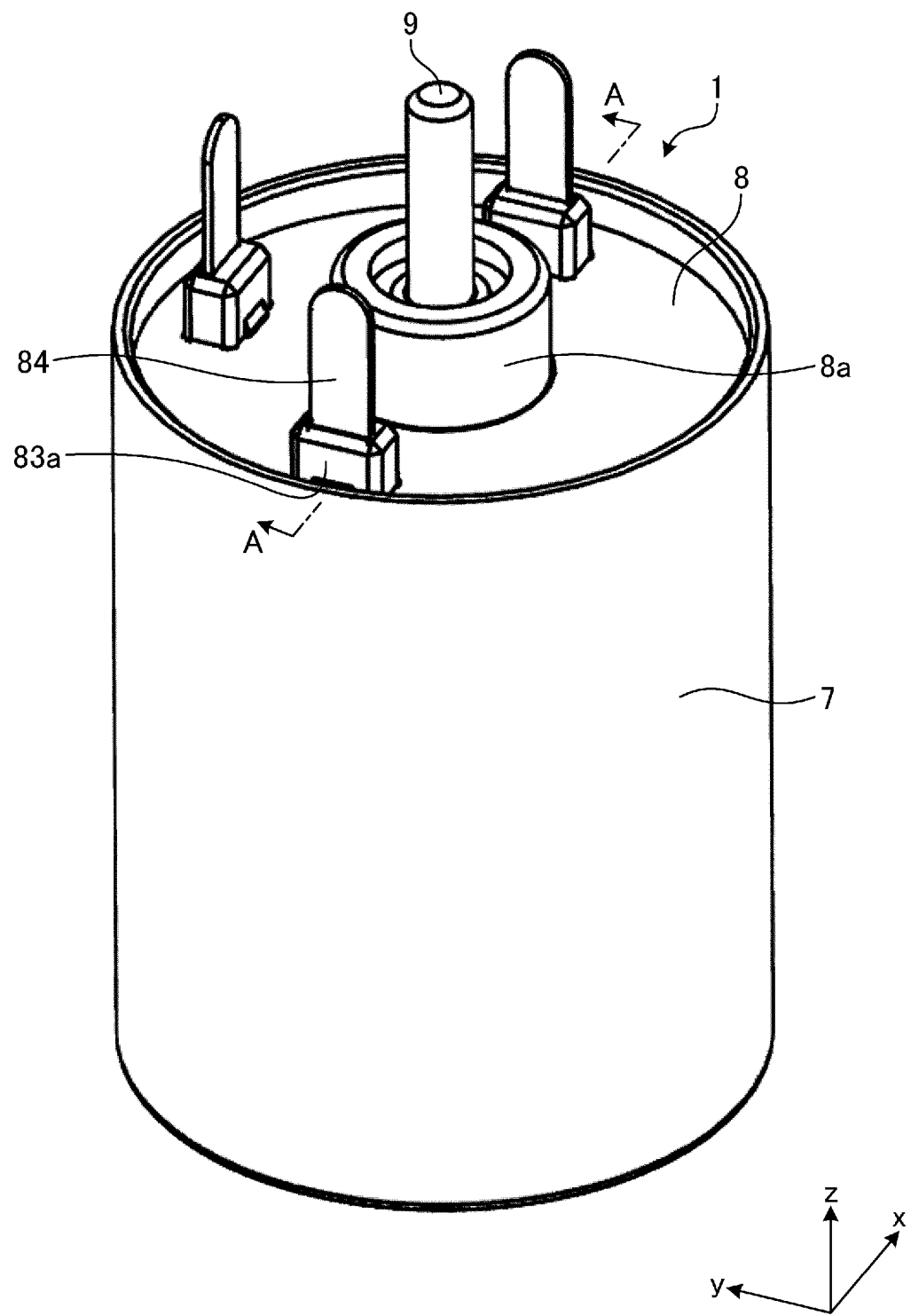
FIG. 1 is an external perspective view of a motor according to an embodiment.

A rotary electric machine disclosed in the present application will be described below with reference to the drawings. Note that the dimensional relationships, the proportions, and the like between elements in the drawings may differ from reality. Among drawings, the dimensional relationships and proportions may not necessarily be the same. For the sake of clarity, a three-dimensional Cartesian coordinate system having a direction along a rotation axis (shaft) of the rotary electric machine as a Z-axis direction may be illustrated in each of the drawings.

Embodiments

Figure 2:
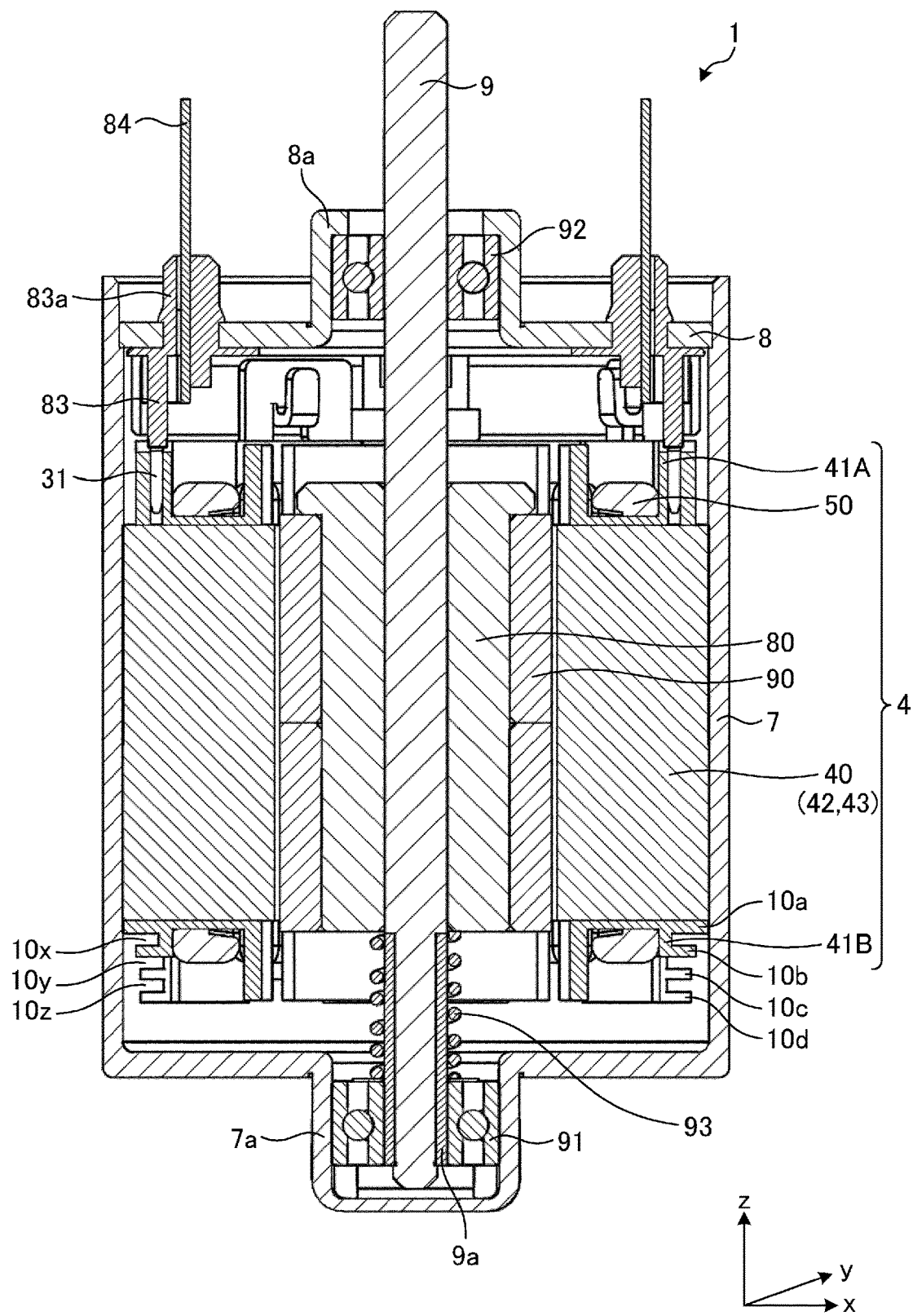
FIG. 2 is a cross-sectional view of the motor taken along line A-A in FIG. 1.

FIG. 1 is an external perspective view of a motor according to an embodiment, and FIG. 2 is a cross-sectional view of the motor taken along line A-A in FIG. 1. In FIG. 1, a motor 1 includes a housing 7 having a substantially cylindrical shape and a cap 8 covering an end part of the housing 7 on an opening side. The housing 7 and the cap 8 are formed of a metal material, for example. A shaft 9 is exposed from a protruding part 8a at a center of the cap 8. Furthermore, a boss part 83a formed of an insulating material such as a resin protrudes from the cap 8, and an external terminal 84 formed of a metal material is exposed from the boss part 83*a*. Note that the motor 1 is an example of a rotary electric machine.

FIG. 2 is a cross-sectional view of the motor 1 taken along line A-A in FIG. 1. In FIG. 2, a bearing 91 is provided inside a protruding part 7*a* at a center of the housing 7 on a side opposite to the side of the cap 8 (at a lower side in FIG. 2), a bearing 92 is provided inside the protruding part 8*a* of the cap 8, and the shaft 9 is rotatably supported by the bearings 91 and 92. Furthermore, the shaft 9 is pressed from the side of the bearing 91 to the side of the bearing 92 by a spring 93. Note that a sleeve 9*a* is provided on an outer circumferential surface of the shaft 9 on the side of the bearing 91.

A rotor yoke 80 having a substantially cylindrical shape is fixed to an outer circumferential surface of the shaft 9 in the vicinity of substantially a center of the shaft 9, and a magnet 90 having a substantially cylindrical shape is fixed to an outer circumferential surface of the rotor yoke 80. The shaft 9, the rotor yoke 80, and the magnet 90 form a rotor.

A stator core 40 including a core back 42 and teeth 43 is fixed to an inner circumferential surface of the housing 7, and a stator coil 50 is wound around the teeth 43 of the stator core 40 via insulators 41A and 41B. The stator core 40 in the present embodiment includes six sets of the core backs 42 and the teeth 43. The stator core 40, the insulators 41A and 41B, and the stator coil 50 form a stator 4. Note that the insulators 41A and 41B are an example of an insulator.

A part of a lead wire connecting stator coils 51 to 56 to each other is wound around each of the teeth 43, then passed to an outer circumferential part of the insulator 41B, and routed to a position of another one of the teeth 43. That is, the motor 1 in the present embodiment is a six-slot three-phase motor, for example. Note that, in the following, to distinguish six teeth 43, the six teeth 43 may be referred to as teeth 431 to 436, respectively. Furthermore, to distinguish the stator coils 50 wound around each of the six teeth 431 to 436, the stator coils 50 may be referred to as stator coils 51 to 56, respectively. Moreover, to distinguish the stator coils 51 to 56 wound around counterclockwise with the lead wire, the stator coils 51 to 56 may be referred to as stator coils 51*c* to 56*c*, respectively.

Meanwhile, a terminal holder 83 is provided inside the cap 8, the boss part 83*a* being a part of the terminal holder 83 protrudes outward from the cap 8, and the external terminal 84 is inserted into the boss part 83*a*. Furthermore, a connection terminal 31 is disposed in the insulator 41A, and when the motor 1 is assembled, the external terminal 84 on the side of the cap 8 and the connection terminal 31 on the side of the insulator 41A engage with each other to be electrically connected.

The external terminal 84 is connected to the outside of the motor 1, and an end part of the lead wire forming the stator coil 50 is welded to or tangled with and connected to the connection terminal 31.

Figure 3:
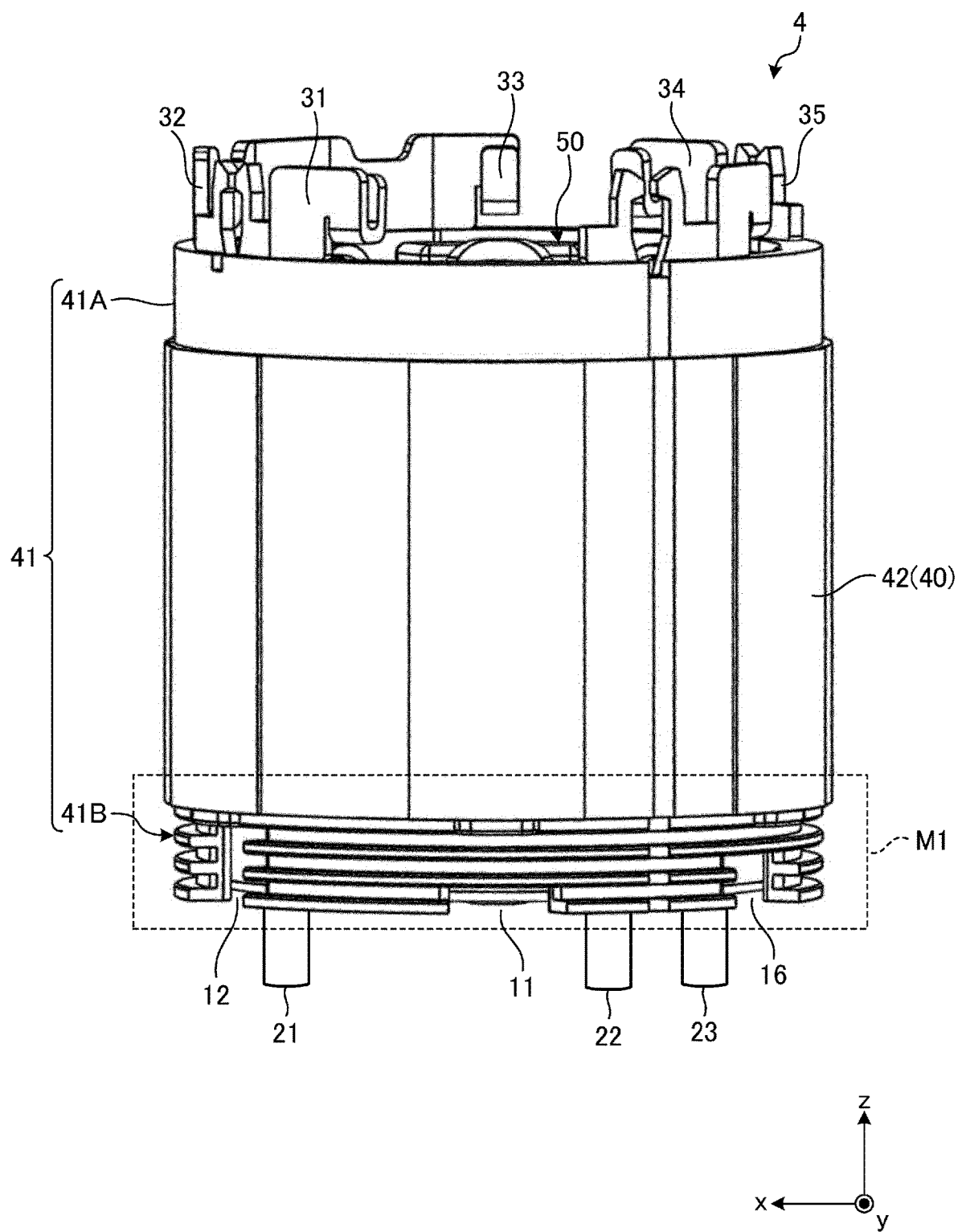
FIG. 3 is a front view of a stator according to the embodiment.
Figure 4:
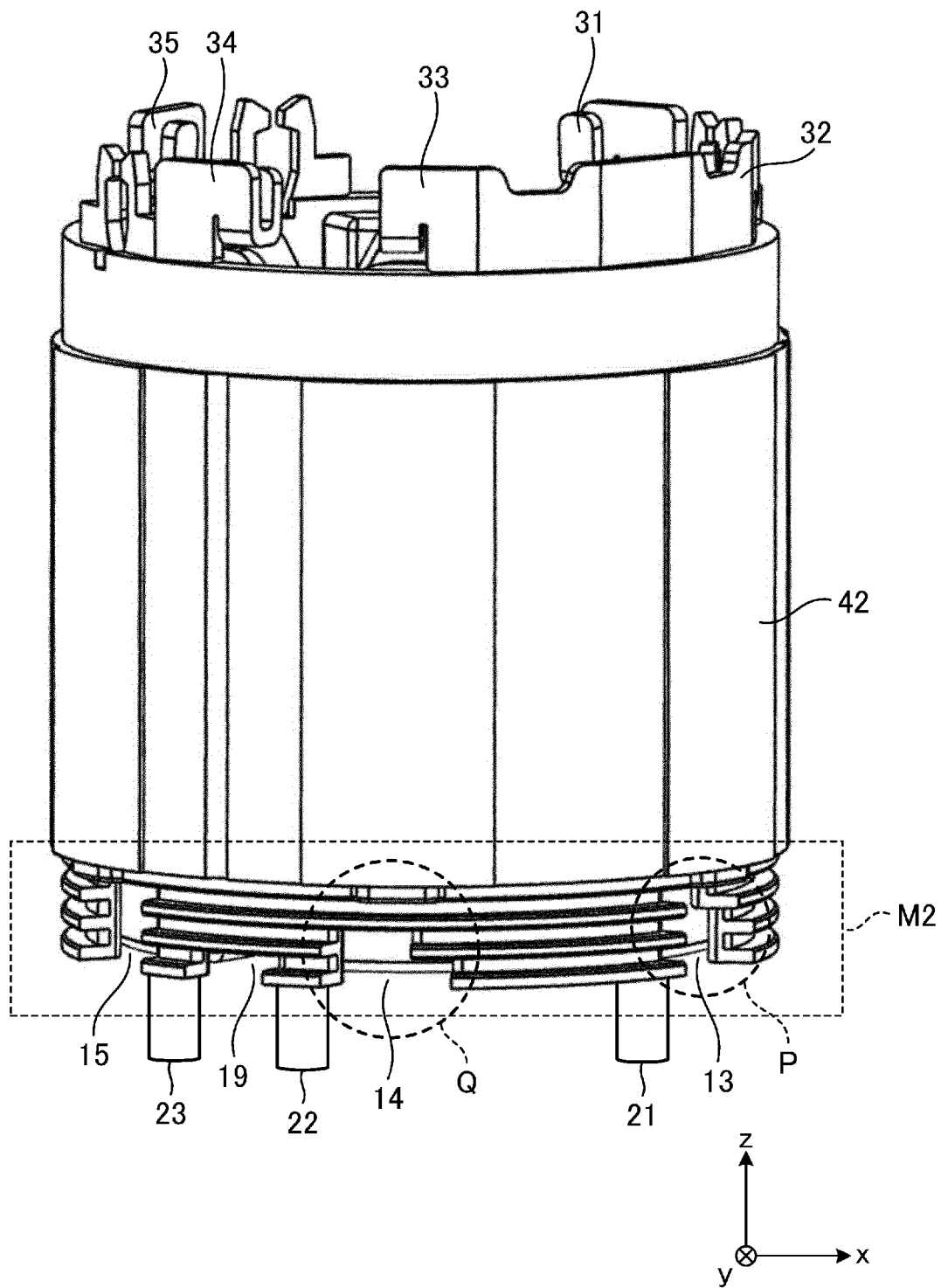
FIG. 4 is a rear view of the stator according to the embodiment.
Figure 5:
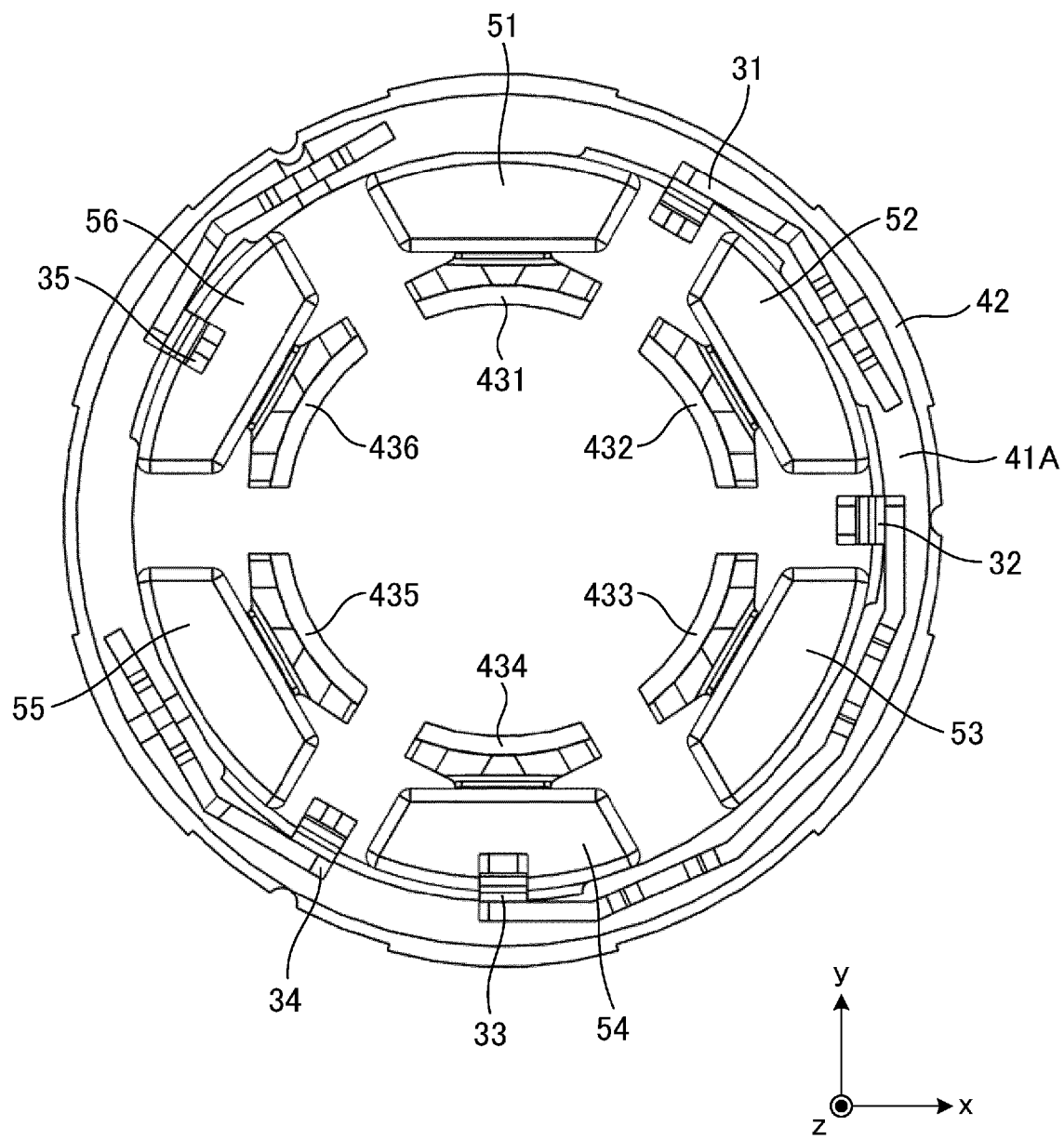
FIG. 5 is a top view of the stator according to the embodiment.
Figure 6:
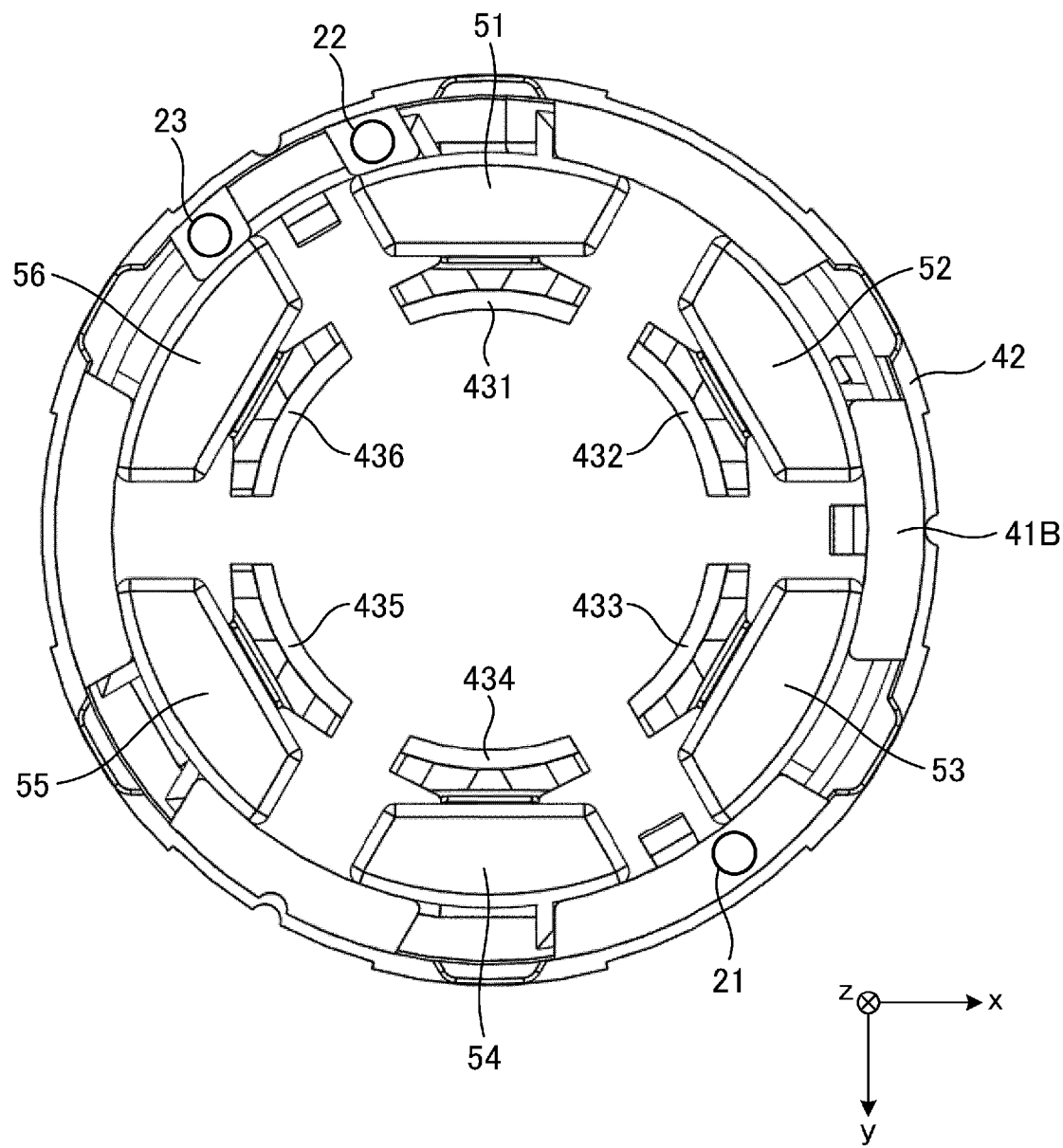
FIG. 6 is a bottom view of the stator according to the embodiment.

FIG. 3 is a front view of a stator according to the embodiment. FIG. 4 is a rear view of the stator according to the embodiment. FIG. 5 is a top view of the stator according to the embodiment. FIG. 6 is a bottom view of the stator according to the embodiment. As illustrated in FIGS. 3 to 5, in addition to the connection terminal 31 illustrated in FIG. 2, connection terminals 32 to 35 are disposed in the insulator 41A of the stator 4 in the present embodiment, and an end part of the lead wire forming the stator coil 50 is welded to or tangled with and connected to the connection terminals 32 to 35. Furthermore, as illustrated in FIGS. 3, 4, and 6, pins 21 to 23 are disposed in the insulator 41B of the stator 4. The end part of the lead wire forming the stator coil 50 may be tangled with the pins 21 to 23, as will be described later.

Furthermore, as illustrated in FIGS. 2 to 4, a plurality of recess parts 10*x* to 10*z* and a plurality of projection parts 10*a* to 10*d* are formed in the circumferential direction in the insulator 41B. The plurality of recess parts 10*x* to 10*z* and the plurality of projection parts 10*a* to 10*d* are formed, for example, in a direction substantially orthogonal to a rotation axis direction of the motor 1 (Z-axis direction). That is, in the present embodiment, each of the plurality of recess parts 10*x* to 10*z* and each of the plurality of projection parts 10*a* to 10*d* are formed substantially in parallel to another one of the recess parts 10*x* to 10*z* and another one of the projection parts 10*a* to 10*d*, respectively. A lead wire connecting the plurality of stator coils 50 to each other is passed in the plurality of recess parts 10*x* to 10*z*. That is, in the motor 1 according to the present embodiment including the three recess parts 10*x* to 10*z*, it is possible to wind the lead wire in a three-stage structure. In the present embodiment, the plurality of recess parts 10*x* to 10*z* are formed at different positions in the rotation axis direction of the motor 1 (Z-axis direction) to, for example, be aligned in the ascending order of distance to the teeth 431 to 436. That is, the recess part 10*x* is formed on a positive side in a Z-axis direction, the recess part 10*z* is formed on a negative side in a Z-axis direction, and the recess part 10*y* is formed at an intermediate area between the recess part 10*x* and the recess part 10*z*.

Figure 7:
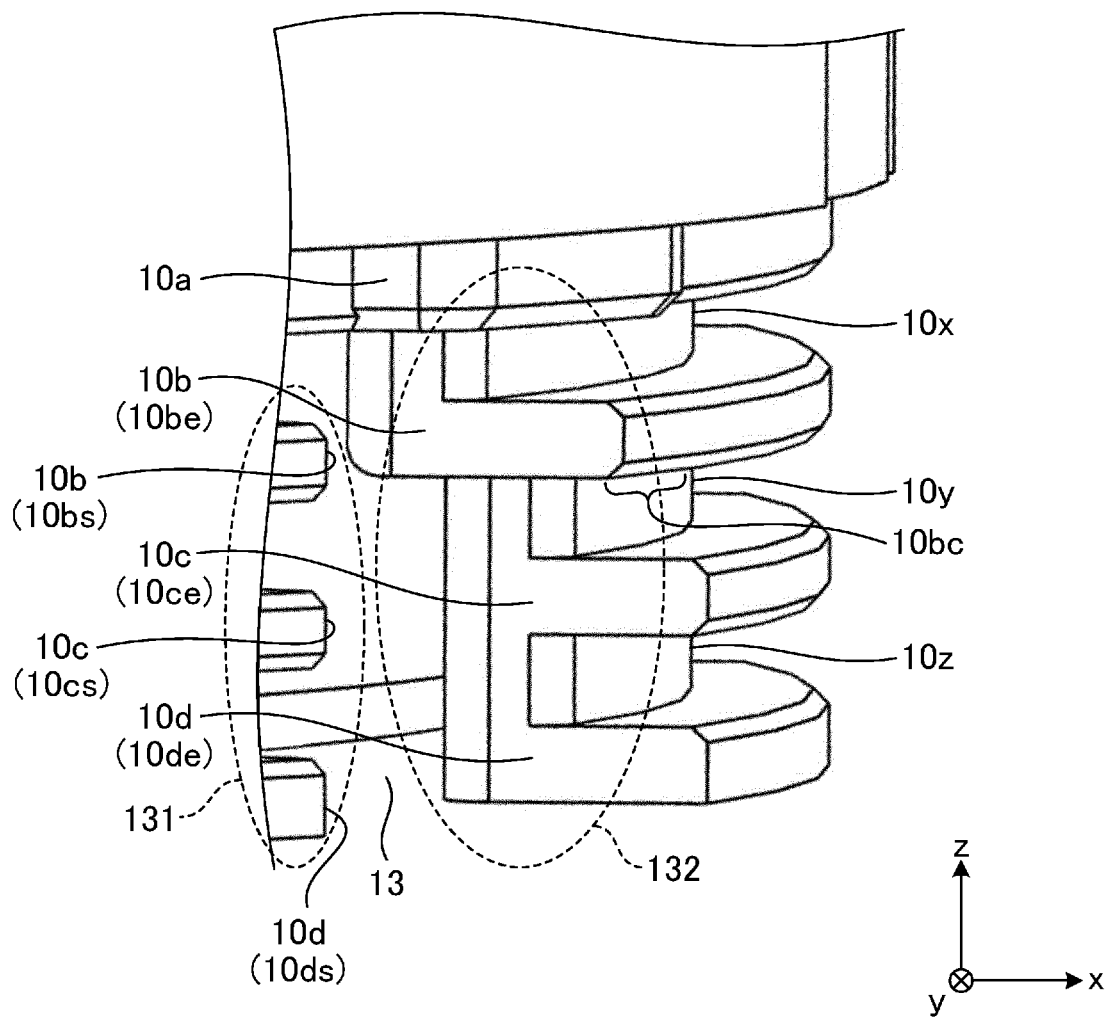
FIG. 7 is an enlarged perspective view of the stator according to the embodiment.

FIG. 7 is an enlarged perspective view of the stator according to the embodiment. FIG. 7 illustrates a portion indicated by reference sign P in FIG. 4, viewed from an obliquely upward direction (a negative direction opposite an X-axis direction, a negative direction opposite a Y-axis direction, and the Z-axis direction). As illustrated in FIG. 7, in the present embodiment, the recess parts 10*x* to 10*z* are each formed by being sandwiched between any two of the projection parts 10*a* to 10*d*. For example, the recess part 10*x* is a portion sandwiched between the projection part 10*a* formed on the positive side in the Z-axis direction and the projection part 10*b* formed on the negative side in the Z-axis direction illustrated in FIG. 7. Similarly, the recess part 10*y* is a portion sandwiched between the projection part 10*b* formed on the positive side in the Z-axis direction and the projection part 10*c* formed on the negative side in the Z-axis direction, and the recess part 10*z* is a portion sandwiched between the projection part 10*c* formed on the positive side in the Z-axis direction and the projection part 10*d* formed on the negative side in the Z-axis direction.

Figure 8:
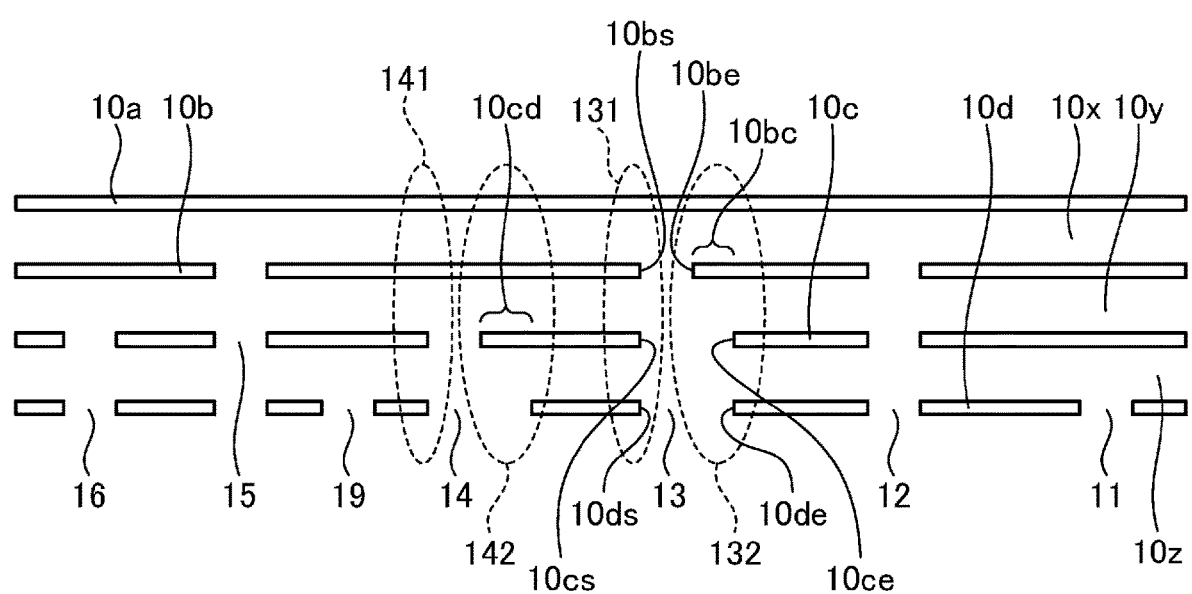
FIG. 8 is a schematic view illustrating an example of a position of a notch part according to the embodiment.

Furthermore, notch parts 11 to 16 are provided in the projection parts 10*b* to 10*d* in the present embodiment. The notch parts 11 to 16 are each formed at a position for drawing in or out the lead wire forming the stator coil 50. FIG. 8 is a schematic view illustrating an example of positions of the notch parts according to the embodiment. For example, as illustrated in FIG. 8, the notch parts 11 to 16 are each formed in accordance with the positions of the teeth 431 to 436 respectively forming the stator coils 51 to 56.

In the present embodiment, the crossover wire wound around any one of the recess parts 10*x* to 10*z* is drawn in from either the left or right direction illustrated in FIG. 8 to the teeth 431 to 436 respectively corresponding to the notch parts 11 to 16, via the notch parts 11 to 16. Furthermore, in the present embodiment, the lead wire wound around each of the teeth 431 to 436 is drawn out to any one of the recess parts 10*x* to 10*z* in either the left or right direction illustrated in FIG. 8, via the notch parts 11 to 16. Note that, in FIG. 8, it is assumed that, for example, the left direction indicates a winding direction of the lead wire to be wound clockwise (CW), and the right direction indicates a winding direction of the lead wire to be wound counterclockwise (CCW).

Note that, in addition to the notch parts 11 to 16 respectively corresponding to the positions of the teeth 431 to 436, another notch parts may be further formed at positions corresponding to the connection terminals 31 to 35 and the like. In the present embodiment, as illustrated in FIG. 8, a notch part 19 located correspondingly to the position of the connection terminal 34 is further formed between the notch part 14 and the notch part 15, for example.

Furthermore, the notch parts 11 to 16 in the present embodiment are formed depending on which recess part the lead wire is passed to, among the recess parts 10x to 10z. Moreover, the notch parts 11 to 16 are formed corresponding to the position of the teeth 43 being the destination of the lead wire to be drawn in. In the present embodiment, when a crossover wire is wound around any one of the recess parts 10x to 10z, the crossover wire can be drawn in to the teeth 431 to 436 or the connection terminals 31 to 35, only in a case where the projection parts 10b to 10d on the negative side in the Z-axis direction from the any one of the recess parts 10x to 10z, that is, the projection parts 10b to 10d on a side far from the teeth 431 to 436 or the connection terminals 31 to 35, the teeth 431 to 436 or the connection terminals 31 to 35 being a destination of the crossover wire to be drawn in, are notched.

In the present embodiment, whether each of the projection parts 10b to 10d is notched differs for each of the notch parts 11 to 16. That is, the notch parts 11 to 16 may not have the same shape. For example, the notch part 11 is formed in the projection part 10d only. In this case, the projection parts 10b and 10c are not notched at the position corresponding to the teeth 431. In this case, among the recess parts 10x to 10z, only a lead wire passed to the recess part 10z at a side farther away from the teeth 431 (at the negative side in the Z-axis direction) than the projection parts 10b and 10c not formed with the notch part 11, can be drawn in to the teeth 431 corresponding to the notch part 11.

Furthermore, the notch parts 14 and 16 are formed not only in the projection part 10d, but also in the projection part 10c, for example. In this case, in addition to the recess part 10z, a lead wire passed to the recess part 10y adjacent to the projection part 10c at a side farther away from the teeth 434 or 436 (at the negative side in the Z-axis direction) than the projection part 10b not formed with the notch parts 14 and 16, can also be drawn in to the teeth 434 corresponding to the notch part 14 and the teeth 436 corresponding to the notch part 16.

Furthermore, the notch parts 12, 13, and 15 are formed in all of the projection parts 10b to 10d, for example. In this case, a lead wire passed to any of the recess parts 10x to 10z can be drawn in to the teeth 432 corresponding to the notch part 12, the teeth 433 corresponding to the notch part 13, and the teeth 435 corresponding to the notch part 15.

Furthermore, when the lead wire is wound by mechanical winding, for example, a lead wire drawn out from the teeth 43 or the connection terminals 31 to 35, the teeth 43 or the connection terminals 31 to 35 being a start point for drawing the lead wire out, is typically placed on the projection parts 10a to 10c (located on the positive side in the Z-axis direction) closer to the start point for drawing the lead wire out, than the recess parts 10x to 10z being a destination of the lead wire to be drawn out. At this time, the notch parts 11 to 16 are desirably provided in the projection parts 10b to 10d (located on the negative side in the Z-axis direction) farther from the start point for drawing the lead wire out than the recess parts 10x to 10z being the destination of the lead wire to be drawn out, and the projection parts 10a to 10c (located on the positive side in the Z-axis direction) closer to the start point for drawing the lead wire out than the recess parts 10x to 10z being the destination of the lead wire to be drawn out, are desirably not notched. For example, when the destination of the lead wire to be drawn out is the recess part 10z, the projection part 10c is also notched in the notch part 12 corresponding to the teeth 432, and thus, it is difficult to draw out the lead wire from the teeth 432 to the recess part 10z.

Therefore, in the present embodiment, as illustrated in FIG. 8, the notch parts 11 to 16 may be formed laterally asymmetrically with respect to at least any one of the projection parts 10b to 10d. For example, a part of the notch parts 11 to 16 may not be formed for any one of the projection parts 10b to 10d.

For example, the notch part 12 illustrated in FIG. 8 is formed in the projection part 10b, similarly to the projection part 10c and the projection part 10d. However, in the notch part 13, a portion of the projection part 10b indicated by reference numeral 10bc is not notched. That is, as illustrated in FIGS. 7 and 8, when the lead wire is wound in the right direction (counterclockwise direction), in the notch part 13, the shape of a position 131 for drawing the lead wire in from the recess parts 10x or 10y and the shape of a position 132 for drawing the lead wire out to the recess part 10y are laterally asymmetrical. For example, at the position 131, the positions of end parts 10bs, 10cs, and 10ds of the three projection parts in the circumferential direction are substantially the same, whereas at the position 132, the position of an end part 10be of the projection part in the circumferential direction and the positions of end parts 10ce and 10de of the projection parts in the circumferential direction are different from each other. In this case, a lead wire drawn out from the teeth 433 corresponding to the notch part 13 to the recess part 10y in the right direction (counterclockwise direction) can be placed on the portion of the projection part 10b indicated by reference numeral 10bc (the lead wire can be placed on a surface of the projection part 10b on the negative side in the Z-axis direction). Thus, the lead wire can be easily drawn out from the teeth 433 to the recess part 10y by mechanical winding, whereas it is difficult to draw out the lead wire from the teeth 432 corresponding to the notch part 12 to the recess part 10y by mechanical winding. Note that the position 131 is an example of a position for drawing a first crossover wire in to a first coil and the position 132 is an example of a position for drawing a second crossover wire out from the first coil.

Similarly, in the notch part 14 illustrated in FIG. 8, a portion of the projection part 10c indicated by reference numeral 10cd is not notched. That is, when the lead wire is wound in the right direction (counterclockwise direction), in the notch part 14, the shape of a position 141 for drawing the lead wire in from the recess parts 10y or 10z and the shape of a position 142 for drawing the lead wire out to the recess part 10z are also laterally asymmetrical. In this case, a lead wire drawn out from the teeth 434 corresponding to the notch part 14 to the recess part 10z in the right direction (counterclockwise direction) can be placed on the portion of the projection part 10c indicated by reference numeral 10cd. Thus, the lead wire can be easily drawn out from the teeth 434 to the recess part 10z by mechanical winding.

Figure 9:
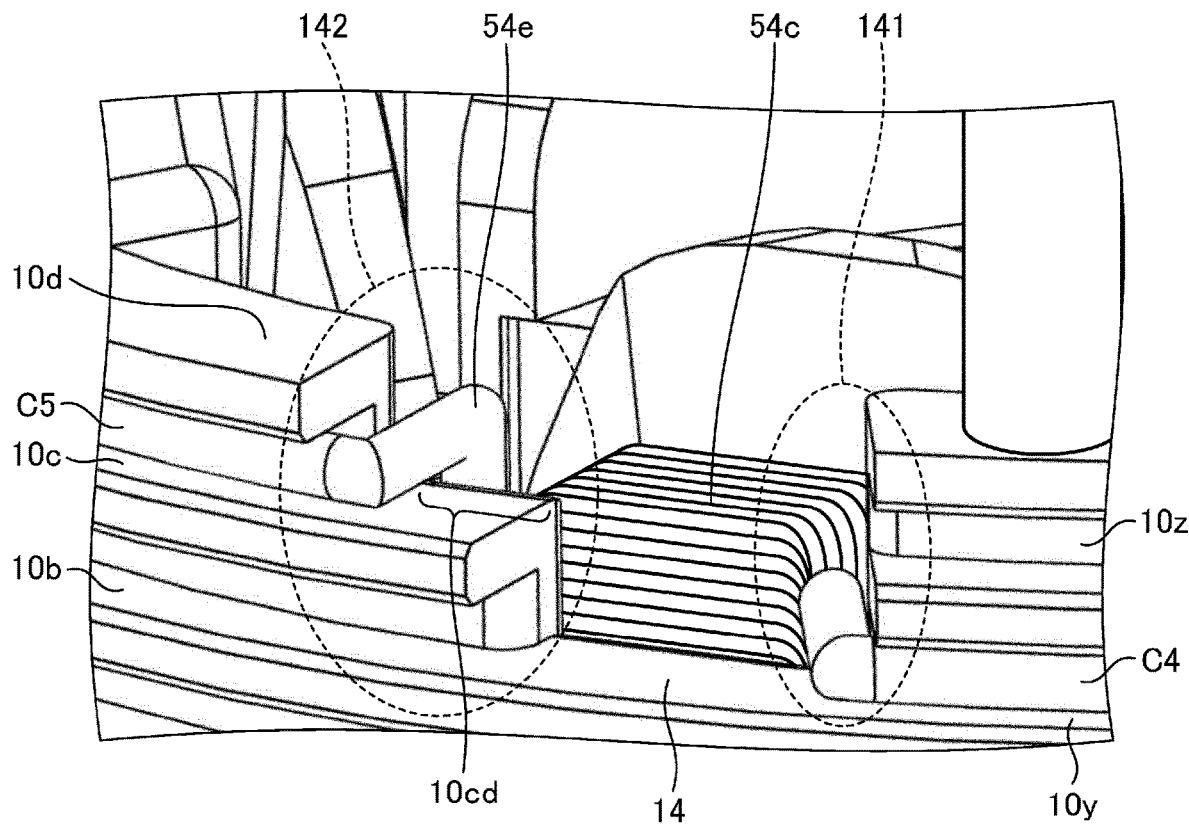
FIG. 9 is an enlarged perspective view of a position for drawing a crossover wire out according to the embodiment.

A lead wire wound by using the notch part 14 having lateral asymmetry as illustrated in FIG. 8 will be described with reference to FIG. 9. FIG. 9 is an enlarged perspective view of a position for drawing a crossover wire out according to the embodiment. FIG. 9 illustrates a portion indicated by reference sign Q in FIG. 4, viewed from an obliquely downward direction (a reverse direction opposite the X-axis direction, a reverse direction opposite the Y-axis direction, and a reverse direction opposite the Z-axis direction). As illustrated in FIG. 9, a crossover wire C4 wound around the recess part 10y of the insulator 41B in the counterclockwise direction is drawn in to the notch part 14 at the position 141. Next, as will be described later, the lead wire connecting to the crossover wire C4 is welded to or tangled with and connected to the connection terminal 33, and then wound around the teeth 434 in the counterclockwise direction to form the stator coil 54c.

Subsequently, the lead wire connecting to a winding end 54e of the stator coil 54c is drawn out from the notch part 14 as a crossover wire C5 and placed on the projection part 10c at the position 142. That is, the crossover wire C5 is wound around the recess part 10z different from the recess part 10y wound around with the crossover wire C4. According to this configuration, a lead wire connecting to the winding end 54e of the stator coil 54c can be easily drawn out to the recess part 10z by mechanical winding.

Figure 10A:
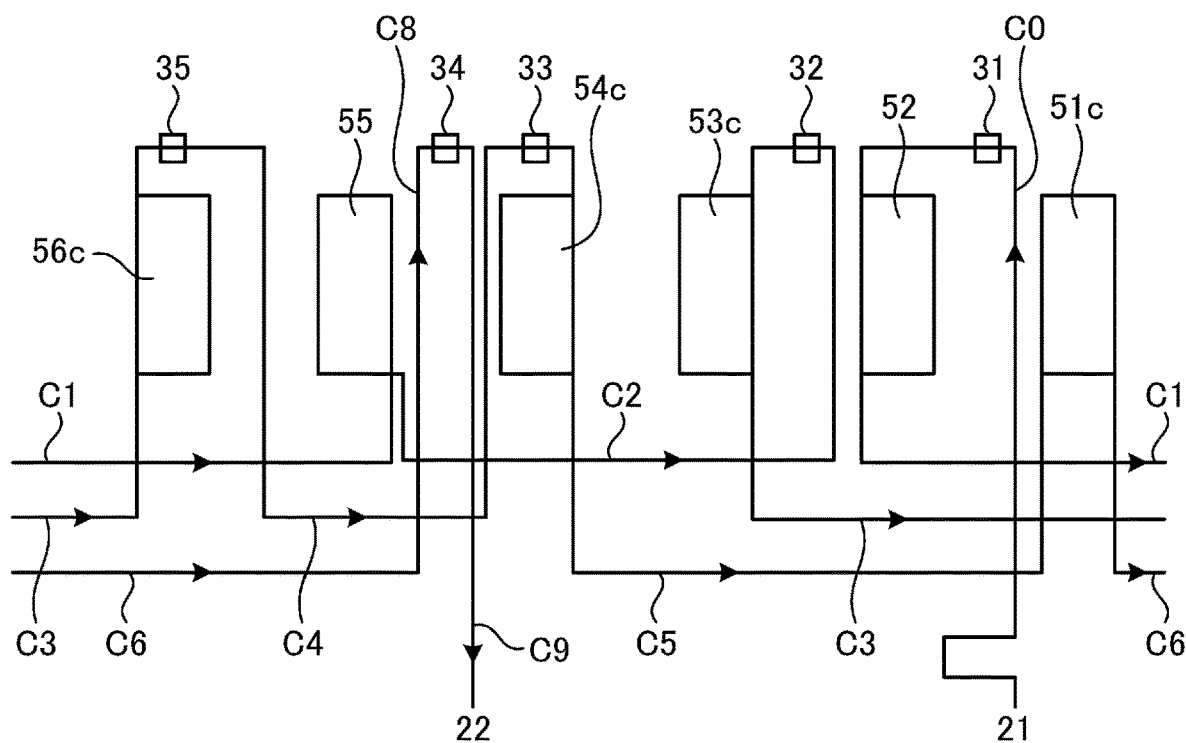
FIG. 10A is a schematic diagram illustrating an example of a routing structure of a crossover wire according to the embodiment.
Figure 10B:
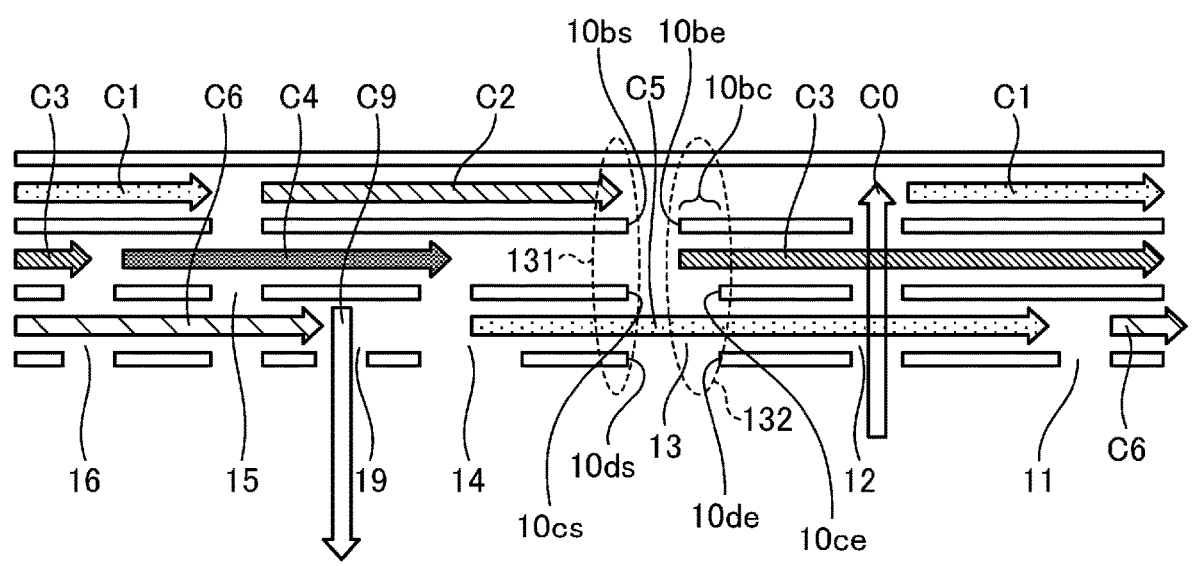
FIG. 10B is a schematic diagram illustrating an example of a routing structure of a crossover wire according to the embodiment.
Figure 11:
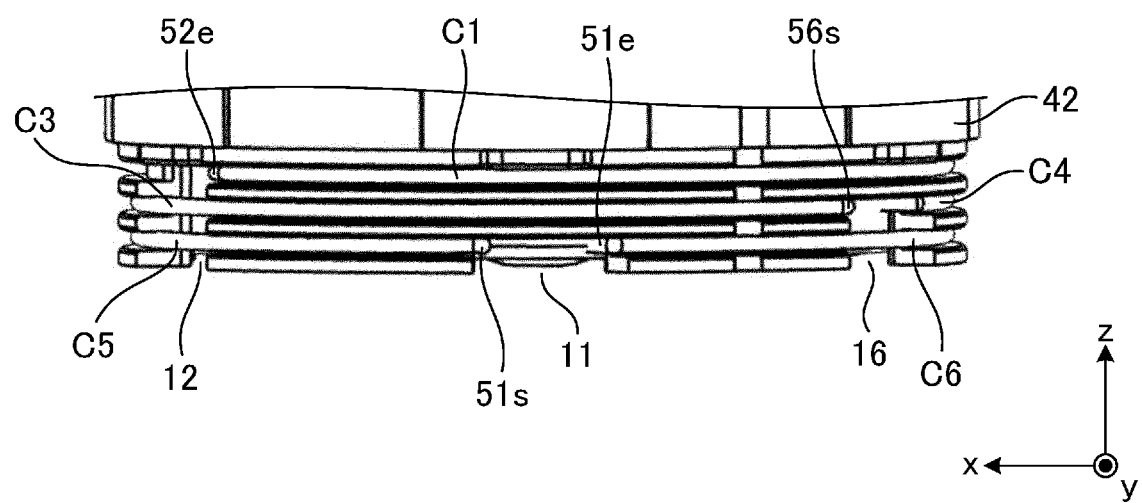
FIG. 11 is a front view illustrating an example of a stator wound around with the crossover wire according to the embodiment.
Figure 12:
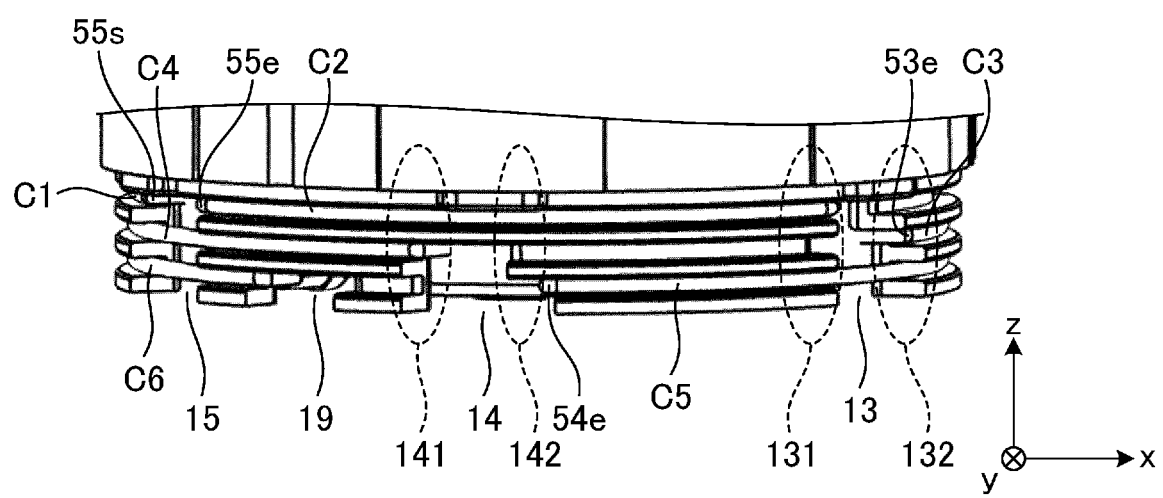
FIG. 12 is a rear view illustrating an example of the stator wound around with the crossover wire according to the embodiment.

A configuration for winding the lead wire around the insulator 41B formed with the projection parts 10a to 10d and the recess parts 10x to 10z will be described with reference to FIGS. 10A to 12. FIGS. 10A and 10B are schematic diagrams illustrating an example of a routing structure of a crossover wire according to the embodiment. FIG. 11 is a front view illustrating an example of a stator wound around with the crossover wire according to the embodiment. FIG. 12 is a rear view illustrating an example of the stator wound around with the crossover wire according to the embodiment. FIG. 11 illustrates a state of crossover wires C1 to C6 wound around a portion indicated by reference numeral M1 in FIG. 3, and FIG. 12 illustrates a state of the crossover wires C1 to C6 wound around a portion indicated by reference numeral M2 in FIG. 4.

A configuration for winding the crossover wire when a rotation direction of the motor 1 is the clockwise direction (CW) will be described with reference to FIGS. 10A to 12. In this case, the stator coils 52 and 55 correspond to the U-phase, the stator coils 53 and 56 correspond to the V-phase, and the stator coils 51 and 54 correspond to the W-phase. Note that, in FIGS. 10A and 10B, similarly to in FIG. 8, arrows to the right indicate that the lead wire is wound in the counterclockwise direction, and arrows to the left indicate that the lead wire is wound in the clockwise direction. Furthermore, in FIGS. 10B, 11, and 12, illustration for the pins 21 to 23 and the connection terminals 31 to 35 is omitted. Note that, in the following description, it is assumed that the expressions "connecting to the winding start" and "connecting to the winding end" include a case of the crossover wire indirectly connecting to a winding start or a winding end of the stator coil 50, without passing through another crossover wire, via the connection terminals 31 to 35 and another one of the stator coils 50.

First, as illustrated in FIGS. 10A and 10B, the lead wire is tangled with the pin 21 and then drawn into the insulator 41B from the notch part 12, as indicated by an arrow C0. The lead wire is welded to or tangled with and connected to the connection terminal 31 and then wound around the teeth 432 in the clockwise direction to form the stator coil 52. In the present embodiment, the connection terminal 31 is electrically connected to a U-phase external terminal 84. As illustrated in FIGS. 10A and 11, the lead wire connecting to a winding end 52e of the stator coil 52 is drawn out from the notch part 12 to the recess part 10x in the counterclockwise direction as the crossover wire C1.

As illustrated in FIGS. 10A and 10B, the crossover wire C1 is wound around half the circumference (180 degrees) of the recess part 10x in the counterclockwise direction, and is drawn into the insulator 41B from the notch part 15. The lead wire connecting from the crossover wire C1 is wound around the teeth 435 in the clockwise direction to form the stator coil 55. That is, as illustrated in FIGS. 10A and 12, the crossover wire C1 connects to a winding start 55s of the stator coil 55. Note that the stator coil 55 is an example of a second coil.

The lead wire connecting to a winding end 55e of the stator coil 55 is drawn out from the notch part 15 to the recess part 10x in the counterclockwise direction as the crossover wire C2. The crossover wire C2 is wound around the recess part 10x in the counterclockwise direction and is drawn into the insulator 41B from the notch part 13 at the position 131 facing the position 132 in the circumferential direction.

The lead wire connecting to the crossover wire C2 is welded to or tangled with and connected to the connection terminal 32 and then wound around the teeth 433 in the counterclockwise direction to form the stator coil 53c. In the present embodiment, the connection terminal 32 serves as a commutator to switch from the U-phase to the V-phase. Note that the stator coil 53c is an example of the first coil, and the crossover wire C2 is an example of the first crossover wire. In the present embodiment, the crossover wire C2 connects indirectly to the winding start of the stator coil 53c via the connection terminal 32.

The lead wire connecting to a winding end 53e of the stator coil 53c is drawn out from the notch part 13 in the counterclockwise direction, as the crossover wire C3, to the recess part 10y different from the recess part 10x wound around with the crossover wire C2. As illustrated by reference numeral 132 in FIGS. 10B and 12, the crossover wire C3 is drawn out to a portion of the projection part 10c indicated by reference numeral 10bc, that is, a portion with the positions of the end part 10be of the projection part 10b in the circumferential direction and the end part 10ce of the projection part 10c in the circumferential direction differing from each other. Note that the crossover wire C3 is an example of the second crossover wire. Furthermore, the recess part 10y wound around with the crossover wire C3 is an example of a second recess part, and the recess part 10y and the recess part 10x wound around with the crossover wire C2 are examples of two recess parts located at different positions in the rotation axis direction. Moreover, the projection parts 10b and 10c are examples of two projection parts facing each other with the second recess part interposed between the two projection parts. Furthermore, at a position indicated by reference numeral 132, a portion of the projection part 10c indicated by reference numeral 10bc is a step formed by the difference in the positions of the end parts 10be and 10ce of the two projection parts 10b and 10c in the circumferential direction.

The crossover wire C3 drawn out to the recess part 10y is wound around half the circumference of the recess part 10y in the counterclockwise direction, and is drawn into the insulator 41B from the notch part 16. The crossover wire C3 is wound around the teeth 436 in the counterclockwise direction to form the stator coil 56c. That is, as illustrated in FIGS. 10A and 11, in the present embodiment, the crossover wire C3 connects to a winding start 56s of the stator coil 56c.

The lead wire connecting to a winding end of the stator coil 56c is welded to or tangled with and connected to the connection terminal 35 and then drawn out from the notch part 16 in the counterclockwise direction, as the crossover wire C4, to the recess part 10y identical to the recess part 10y wound around with the crossover wire C3. In the present embodiment, the connection terminal 35 is electrically connected to a V-phase external terminal 84.

As illustrated in FIG. 10B and by reference numeral 141 in FIG. 12, the crossover wire C4 is wound around the recess part 10y in the counterclockwise direction and is drawn in to the teeth 434 from the notch part 14. The lead wire connecting to the crossover wire C4 is welded to or tangled with and connected to the connection terminal 33 and then wound around the teeth 434 in the counterclockwise direction to form the stator coil 54c. In the present embodiment, the connection terminal 33 serves as a commutator to switch from the V-phase to the W-phase.

As illustrated in FIG. 10B and by reference numeral 142 in FIG. 12, the lead wire connecting to the winding end 54e of the stator coil 54c is drawn out from the notch part 14 in the counterclockwise direction, as the crossover wire C5, to the recess part 10z different from the recess part 10y wound around with the crossover wire C4. The crossover wire C5 is drawn out to the portion of the projection part 10c indicated by reference numeral 10cd.

Note that, as illustrated in FIGS. 9 and 12, at the position 141 for drawing the crossover wire C4 in to the stator coil 54c, the positions of end parts of the two projection parts 10c and 10d in the circumferential direction are substantially the same. On the other hand, at the position 142 for drawing the crossover wire C5 out from the stator coil 53c, the positions of end parts of the two projection parts 10c and 10d in the circumferential direction are different from each other.

The crossover wire C5 drawn out to the recess part 10z is wound around half the circumference of the recess part 10z in the counterclockwise direction, and is drawn into the insulator 41B from the notch part 11. As illustrated in FIGS. 10A and 11, the crossover wire C5 connects to a winding start 51s of the stator coil 51c. Subsequently, the lead wire is wound around the teeth 431 in the counterclockwise direction to form the stator coil 51c. Then, the lead wire connecting to a winding end 51e of the stator coil 51c is drawn out from the notch part 11 to the recess part 10z in the counterclockwise direction as the crossover wire C6.

The crossover wire C6 is wound around the recess part 10z in the counterclockwise direction and is drawn into the insulator 41B from the notch part 19. The lead wire is welded to or tangled with and connected to the connection terminal 34, and then drawn out from the notch part 19, as indicated by an arrow C9 in FIGS. 10A and 10B, and tangled with the pin 22. In the present embodiment, the connection terminal 34 is electrically connected to a W-phase external terminal 84. Thus, in the present embodiment, the stator coil 50 including the crossover wires C1 to C4 is formed continuously by the same lead wire, for example.

As described above, the motor 1 according to the present embodiment includes the first coil 53c including a winding start and a winding end, the first crossover wire C2 connecting to the winding start of the first coil 53c, the second crossover wire C3 connecting to the winding end of the first coil, and an insulator 41 including tubular parts 41A and 41B wound around with the first coil, and an outer circumferential lateral surface 41B coupled with the tubular parts. The plurality of recess parts 10x to 10z are formed on the outer circumferential lateral surface 41B of the insulator in the rotation axis direction, and the first crossover wire C2 and the second crossover wire C3 are disposed in two recess parts, that is, the recess parts 10x and 10y located at different positions in the rotation axis direction, among the plurality of recess parts 10x to 10z. Thus, it is possible to provide a rotary electric machine configured to allow a lead wire to be easily wound.

Modification

In the embodiment, the motor 1 configured to rotate in the clockwise direction (CW) has been described, but the embodiment is not limited to the motor 1. For example, a motor 2 configured to rotate in the counterclockwise direction (CCW) can be also realized by changing the order and direction of the lead wire to be wound around the insulator 41B. Furthermore, a crossover wire may be wound in a direction different from that of the other crossover wires in the plurality of recess parts 10x to 10z.

Figure 13A:
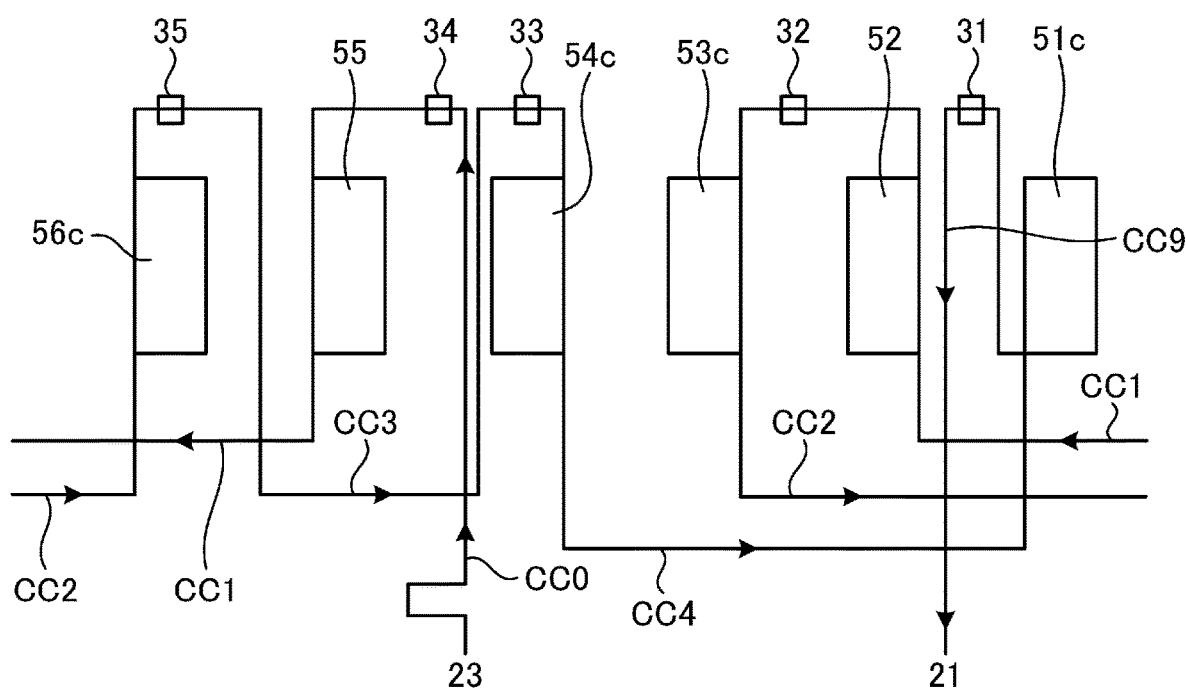
FIG. 13A is a schematic diagram illustrating an example of a routing structure of a crossover wire according to a modification.
Figure 13B:
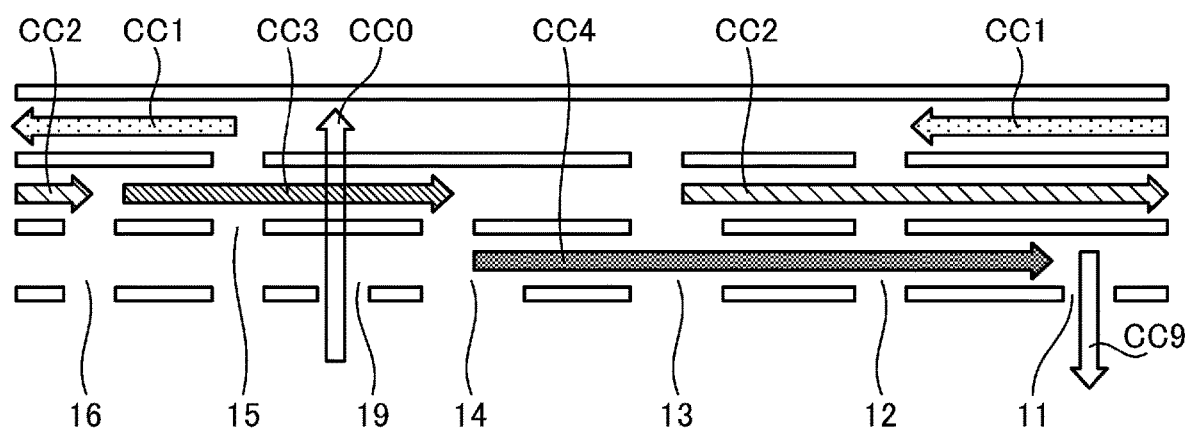
FIG. 13B is a schematic diagram illustrating an example of a routing structure of a crossover wire according to the modification.
Figure 14:
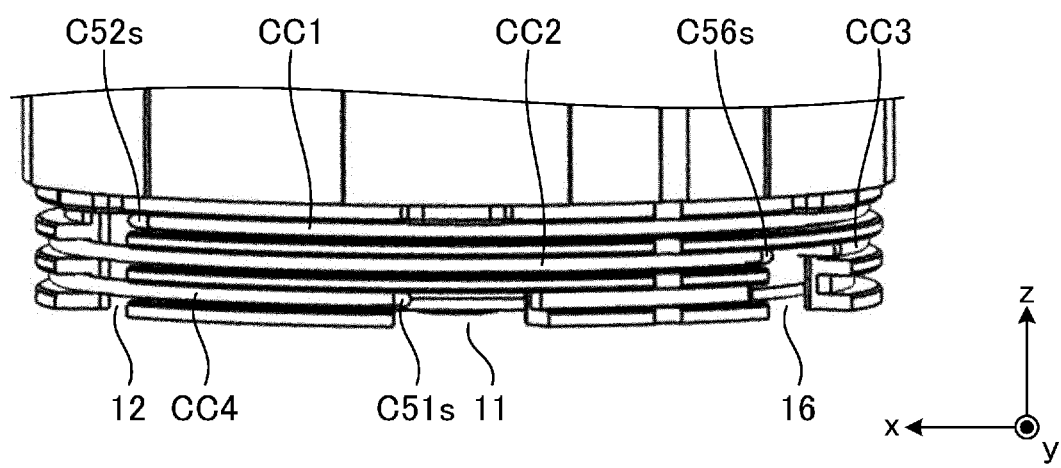
FIG. 14 is a front view illustrating an example of a stator wound around with a crossover wire according to the modification.
Figure 15:
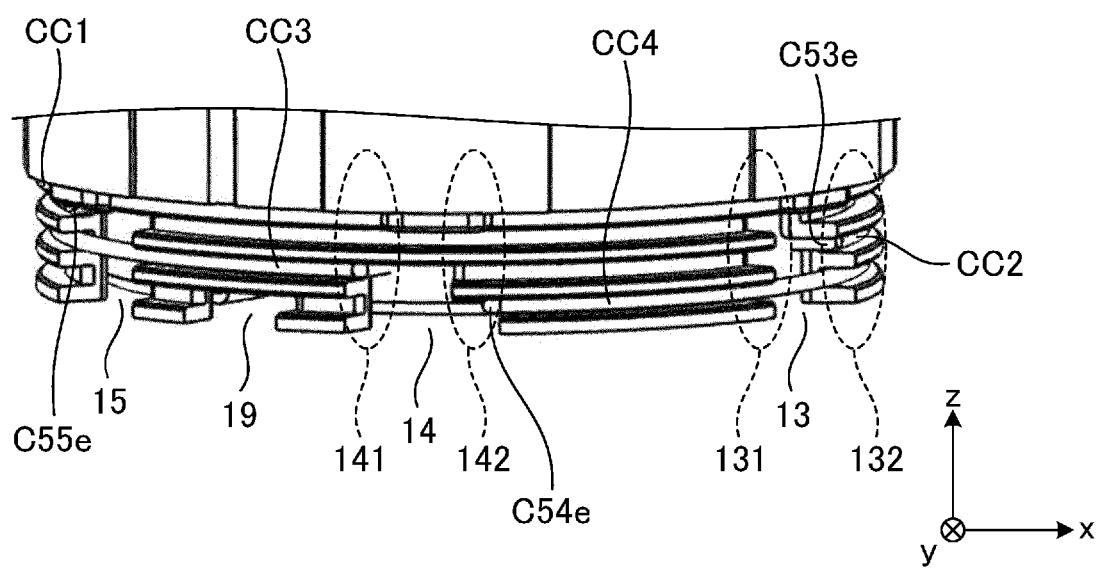
FIG. 15 is a rear view illustrating an example of the stator wound around with the crossover wire according to the modification.

In a modification, a configuration for winding a lead wire around the insulator 41B of the motor 2 will be described with reference to FIGS. 13A to 15. Note that, in the following, parts identical to those illustrated in the drawings described previously are designated by the same reference numerals, and duplicate description will be omitted. FIGS. 13A and 13B are schematic diagrams illustrating an example of a routing structure of a crossover wire according to the modification. FIG. 14 is a front view illustrating an example of a stator wound around with a crossover wire according to the modification. FIG. 15 is a rear view illustrating an example of the stator wound around with the crossover wire according to the modification.

FIGS. 13A to 15 illustrate a configuration for winding a lead wire around the insulator 41B in the motor 2 configured to rotate in the counterclockwise direction (CCW). The modification is configured in much the same way as the embodiment in that the stator coils 53 and 56 correspond to the V-phase, but differs in that the stator coils 52 and 55 correspond to the W-phase and the stator coils 51 and 54 correspond to the U-phase. Note that, in FIGS. 13A and 13B, arrows to the right indicate that the lead wire is wound in the counterclockwise direction, and arrows to the left indicate that the lead wire is wound in the clockwise direction. Furthermore, in FIGS. 13B, 14, and 15, similarly to FIGS. 10B, 11, and 12, illustration for the pins 21 to 23 and the connection terminals 31 to 35 is omitted.

First, as illustrated in FIG. 13A, the lead wire is tangled with the pin 23 and then drawn into the insulator 41B from the notch part 19, as indicated by an arrow CC0, and welded to or tangled with and connected to the connection terminal 34. In the modification, the connection terminal 34 is electrically connected to a W-phase external terminal 84.

Subsequently, the lead wire is wound around the teeth 435 in the clockwise direction to form the stator coil 55. As illustrated in FIGS. 13A and 15, the lead wire connecting to a winding end C55e of the stator coil 55 is drawn out from the notch part 15 to the recess part 10x in the clockwise direction (the left direction) as a crossover wire CC1.

As illustrated in FIG. 14, the crossover wire CC1 is wound around half the circumference (180 degrees) of the recess part 10x in the clockwise direction, and is drawn into the insulator 41B from the notch part 12. The lead wire connecting to the crossover wire CC1 is wound around the teeth 432 in the clockwise direction to form the stator coil 52. That is, in the present modification, the crossover wire CC1 connects to a winding start C52s of the stator coil 52. Note that, in the present modification, the crossover wire CC1 is an example of the first crossover wire, and the stator coil 52 is an example of a third coil.

In the present modification, a lead wire connecting to the winding end of the stator coil 52 is not drawn out to the notch part 12, but welded to or tangled with and connected to the connection terminal 32. In the present modification, the connection terminal 32 serves as a commutator to switch from the W-phase to the V-phase. Subsequently, the lead wire is wound around the teeth 433 in the counterclockwise direction to form the stator coil 53*c*. Note that, in the present modification, the stator coil 53*c* is an example of the first coil. In the present modification, the first crossover wire CC1 indirectly connects to the winding start of the first coil 53*c* via another stator coil, that is, the stator coil 52, and the connection terminal 32.

As illustrated in FIG. 13B and by reference numeral 132 in FIG. 15, the lead wire connecting to a winding end C53*e* of the stator coil 53*c* is drawn out from the notch part 13 in the counterclockwise direction, as a crossover wire CC2, to the recess part 10*y* different from the recess part 10*x* wound around with the crossover wire CC1. The crossover wire CC2 is drawn out to a portion of the projection part 10*c* indicated by reference numeral 10*bc*, and is wound around half the circumference (180 degrees) of the recess part 10*y* in the counterclockwise direction. Note that the crossover wire CC2 is an example of the second crossover wire.

As illustrated in FIGS. 13B and 14, the crossover wire CC2 is drawn into the insulator 41B from the notch part 16. The lead wire connecting to the crossover wire CC2 is wound around the teeth 436 in the counterclockwise direction to form the stator coil 56*c*, and then, the lead wire is welded to or tangled with and connected to the connection terminal 35. That is, as illustrated in FIGS. 13B and 14, in the present modification, the crossover wire CC2 connects to a winding start C56*s* of the stator coil 56*c*. In the present modification, the connection terminal 35 is electrically connected to a V-phase external terminal 84. Note that the stator coil 56*c* is an example of a fourth coil.

The lead wire welded to or tangled with and connected to the connection terminal 35 is drawn out from the notch part 16, as the crossover wire CC3, to the recess part 10*y* identical to the recess part 10*y* wound around with the crossover wire CC2. As illustrated in FIGS. 13B and 14, in the present modification, the crossover wire CC3 indirectly connects to the winding end of the stator coil 56*c* via the connection terminal 35. Note that the crossover wire CC3 is an example of a third crossover wire.

As illustrated in FIGS. 13B and 15, the crossover wire CC3 is wound around the recess part 10*y* in the counterclockwise direction and is drawn in to the teeth 434 from the notch part 14. The lead wire connecting to the crossover wire CC3 is welded to or tangled with and connected to the connection terminal 33 and then wound around the teeth 434 in the counterclockwise direction to form the stator coil 54*c*. In the modification, the connection terminal 33 serves as a commutator to switch from the V-phase to the U-phase.

As illustrated in FIG. 13B and by reference numeral 142 in FIG. 15, the lead wire connecting to a winding end C54*e* of the stator coil 54*c* is placed, as a crossover wire CC4, on a portion indicated by the projection part 10*c* reference numeral 10*cd*. Thus, the crossover wire CC4 is drawn out from the notch part 14, in the counterclockwise direction, to the recess part 10*z* different from the recess part 10*y* wound around with the crossover wire CC3.

As illustrated in FIGS. 13B and 14, the crossover wire CC4 is wound around half the circumference of the recess part 10*z* in the counterclockwise direction, and is drawn into the insulator 41B from the notch part 11. Subsequently, the lead wire connecting to the crossover wire CC4 is wound around the teeth 431 in the counterclockwise direction to form the stator coil 51*c*. That is, as illustrated in FIGS. 13B and 14, the crossover wire CC4 connects to a winding start C51*s* of the stator coil 51*c*.

In the present modification, the lead wire connecting to the winding end of the stator coil 51 is welded to or tangled with and connected to the connection terminal 31, and is then drawn out from the notch part 11, as indicated by an arrow CC9, and tangled with the pin 21. In the present modification, the connection terminal 31 is electrically connected to a U-phase external terminal 84. Thus, also in the present modification, the stator coil 50 including the crossover wires CC1 to CC4 is formed by the same lead wire.

As described above, in the motor 2 according to the present modification, the winding start of the first coil 53*c* may connect to the winding end of the third coil 52 having a phase different from the phase of the first coil 53*c*, without passing through another crossover wire. Furthermore, in the motor 2 according to the present modification, the third crossover wire CC3 connecting to the winding end of the fourth coil 56*c* having the winding start C56*s* connecting to the second crossover wire CC2, may be disposed in the recess part 10*y* identical to the recess part 10*y* wound around with the second crossover wire CC2. Moreover, the crossover wires disposed in the plurality of recess parts 10*x* to 10*z* of the motor 2 according to the present modification may include the crossover wire CC1 disposed in a rotation direction (the clockwise direction) different from a rotation direction (the counterclockwise direction) of disposal of the second crossover wire CC2 and the other crossover wires CC3 and CC4. Thus, it is possible to improve the degree of freedom in disposing the crossover wires.

Furthermore, the insulator 41 identical to the insulator employed in the motor 1 having a rotation direction different from that of the motor 2 may be employed in the motor 2 according to the present modification. Thus, it is not necessary to prepare different insulators in accordance with the rotation direction, and therefore, the manufacturing cost can be reduced.

Embodiments of the present invention have been described above, but the present invention is not limited to the embodiments described above, and various modifications are possible without departing from the spirit of the present invention. For example, the motor 1 is described as an example of a rotary electric machine, but the rotary electric machine is not limited to the motor 1, and may be, for example, another rotary electric machine such as a generator. Furthermore, a six-slot three-phase motor is illustrated as the motor 1, but the number of slots and the like of the rotary electric machine is not limited to this.

Furthermore, as indicated by reference numerals 10*bc* and 10*cd* in FIG. 8, a configuration of the notch parts 11 to 16 not notched in a part of the projection parts 10*b* to 10*d* at the side in the right direction (at the side in the counterclockwise direction) is illustrated, but the embodiment is not limited to the configuration. For example, the following configuration may be employed. A part of the notch parts 11 to 16 of the projection parts 10*b* to 10*d* may not be notched at the side in the left direction (the side in the clockwise direction), or a part of the notch parts 11 to 16 may not be notched at both sides in the left and right direction. Therefore, even when the lead wire is drawn out from the teeth 43 in the left direction (the clockwise direction), the lead wire can be easily wound by mechanical winding.

Furthermore, a configuration of the plurality of recess parts 10*x* to 10*z* disposed at different positions in the rotation axis direction (Z-axis direction) of the motor 1 is described, but the embodiment is not limited to the configuration, and in another configuration, for example, a plurality of recess parts may be disposed at different positions in the radial direction, for example, disposed concentrically around a shaft of the rotary electric machine. In such a case, similarly to the present embodiment, the plurality of recess parts may be disposed at different positions in the rotation axis direction, or as another configuration, for example, at least two recess parts of the plurality of recess parts may be disposed in a straight line in the rotation axis direction.

Also, the relationship between the dissimilarity in phase between the two stator coils 50 connected by the crossover wire, and the dissimilarity between the recess parts wound around with the two crossover wires, is not limited to the examples described in the embodiment and the modification. For example, in the embodiment, the crossover wire C4 connecting to the winding end of the stator coil 56c and the winding start of the stator coil 54c, the stator coil 56c and the stator coil 54c having phases different from each other, and the crossover wire C5 connecting to the winding end of the stator coil 54c may be wound around the same recess part. Furthermore, in the modification, the crossover wire CC2 connecting to the winding end of the stator coil 53c and the winding start of the stator coil 56c, the stator coil 53c and the stator coil 56c having phases identical to each other, and the crossover wire CC3 connecting to the winding end of the stator coil 56c may be wound around recess parts different from each other.

Moreover, the present invention is not limited to the embodiment described above. A configuration obtained by appropriately combining the above-mentioned constituent elements is also included in the present invention. Further effects and modifications can be easily derived by a person skilled in the art. Thus, a wide range of aspects of the present invention is not limited to the embodiment described above, and may be modified variously.

REFERENCE SIGNS LIST

1 Motor
4 Stator
7 Housing
8 Cap
9 Shaft
91, 92 Bearing
93 Spring
80 Rotor yoke
90 Magnet
40 Stator core
41A, 41B Insulator
50, 51 to 56 Stator coil
83 Terminal holder
83a Boss part
10a to 10d Projection part
10x to 10z Recess part
11 to 16 Notch part
21 to 23 Pin
31 to 35 Connection terminal
C1 to C6, CC1 to CC4 Crossover wire

The invention claimed is:

1. A rotary electric machine, comprising:
a first coil including a winding start and a winding end;
a first crossover wire connecting to the winding start of the first coil;
a second crossover wire connecting to the winding end of the first coil; and
an insulator including a tubular part wound around with the first coil and an outer circumferential lateral surface coupled with the tubular part,
wherein the outer circumferential lateral surface of the insulator is formed with a plurality of recess parts in a rotation axis direction, and
the first crossover wire and the second crossover wire are disposed in two recess parts located at different positions in the rotation axis direction, among the plurality of recess parts,
wherein the first crossover wire connects to a winding end of a second coil having a phase different from a phase of the first coil.

2. The rotary electric machine according to claim 1,
wherein the plurality of recess parts are each formed by two projection parts facing each other in the rotation axis direction, and
in a second recess part configured to allow the second crossover wire to be disposed, positions of end parts in a circumferential direction of the two projection parts facing each other with the second recess part interposed between the two projection parts, are different from each other at a position for drawing the second crossover wire out to the second recess part.

3. The rotary electric machine according to claim 2,
wherein positions of end parts in the circumferential direction of the two projection parts facing each other with the second recess part interposed between the two projection parts are substantially the same at a position for drawing the first crossover wire in to the first coil.

4. The rotary electric machine according to claim 1,
wherein the winding start of the first coil connects to a winding end of a third coil having a phase different from a phase of the first coil.

5. The rotary electric machine according to claim 1,
wherein the second crossover wire connects to a winding start of a fourth coil, and
a third crossover wire connecting to a winding end of the fourth coil is disposed in a recess part identical to a recess part wound around with the second crossover wire.

6. The rotary electric machine according to claim 1,
wherein the first crossover wire and the second crossover wire are formed by the same lead wire.

7. The rotary electric machine according to claim 1,
wherein crossover wires disposed in the plurality of recess parts include a crossover wire disposed in a rotation direction different from a rotation direction of disposal of another crossover wire.

* * * * *